United States Patent
Eliyahu et al.

(10) Patent No.: US 11,928,423 B1
(45) Date of Patent: Mar. 12, 2024

(54) TRANSACTION ENTITY PREDICTION THROUGH LEARNED EMBEDDINGS

(71) Applicant: Intuit, Inc., Mountain View, CA (US)

(72) Inventors: Natalie Bar Eliyahu, Azor (IL); Shirbi Ish-Shalom, Orlando, FL (US); Omer Wosner, Naale (IL); Dmitry Burshtein, Tel Aviv (IL)

(73) Assignee: Intuit, Inc., Mountain View, CA (US)

( * ) Notice: Subject to any disclaimer, the term of this patent is extended or adjusted under 35 U.S.C. 154(b) by 0 days.

(21) Appl. No.: 18/198,777

(22) Filed: May 17, 2023

(51) Int. Cl.
  *G06F 17/00* (2019.01)
  *G06F 40/174* (2020.01)
  *G06F 40/20* (2020.01)

(52) U.S. Cl.
  CPC ............ *G06F 40/174* (2020.01); *G06F 40/20* (2020.01)

(58) Field of Classification Search
  CPC ................................ G06F 40/174; G06F 40/20
  See application file for complete search history.

(56) References Cited

U.S. PATENT DOCUMENTS

| | | | | |
|---|---|---|---|---|
| 8,589,399 B1 * | 11/2013 | Lee | ........................ | G06F 16/313 707/737 |
| 2012/0036130 A1 * | 2/2012 | Light | ........................ | G06F 40/30 707/769 |
| 2017/0091320 A1 * | 3/2017 | Psota | ..................... | G06F 16/3337 |
| 2019/0138652 A1 * | 5/2019 | Miranda | ............. | G06F 16/3347 |
| 2020/0226460 A1 * | 7/2020 | Bruss | ..................... | G06F 16/254 |
| 2022/0358594 A1 * | 11/2022 | Zhu | ........................ | G06N 20/00 |
| 2023/0124258 A1 * | 4/2023 | Zhao | ......................... | G06F 5/01 706/21 |

OTHER PUBLICATIONS

Khazane, Anish, et al. "Deeptrax: Embedding graphs of financial transactions." 2019 18th IEEE International Conference on Machine Learning and Applications (ICMLA). IEEE, 2019 (Year: 2019).*

Ren, Jiangtao, Jiawei Long, and Zhikang Xu. "Financial news recommendation based on graph embeddings." Decision Support Systems 125 (2019): 113115 (Year: 2019).*

* cited by examiner

*Primary Examiner* — Andrew T McIntosh
(74) *Attorney, Agent, or Firm* — Dinsmore & Shohl LLP

(57) ABSTRACT

Certain aspects of the disclosure pertain to inferring a candidate entity associated with a transaction with a machine learning model. An organization identifier and description associated with a transaction can be received as input. In response, an entity embedding, comprising a vector for each entity of an organization based on the organization identifier, can be retrieved from storage. A machine learning model can be invoked with the entity embedding and description. The machine learning model can be trained to infer a transaction embedding from the description and compute a similarity score between the transaction embedding and each vector of the entity embedding. A candidate entity with a similarity score satisfying a threshold can be identified and returned. The candidate entity with the highest similarity score can be identified in certain aspects.

20 Claims, 12 Drawing Sheets

TRANSACTION ENTITY PREDICTION THROUGH LEARNED EMBEDDINGS

BACKGROUND

Field

Aspects of the subject disclosure relate to machine-learning-based data entry prediction.

Description of Related Art

Automated data entry (e.g., automatic field filling or completion) is a feature of software applications that aims to improve user experience by reducing the time and effort required to input data. This feature suggests or automatically fills in the content of a field and is particularly useful in scenarios where the input data is repetitive or standardized, such as online forms or database management systems, and can significantly improve productivity and efficiency. The effectiveness of automated data entry depends on the ability to identify correct content. Traditionally, text string matching techniques are employed to identify content. However, such techniques are highly sensitive to transaction data including exact or near word matches. Consider a situation in which a field corresponds to a vendor associated with a bank transaction. If a text string in bank transaction data is an exact or near match to a vendor name, then the vendor name can be the content utilized for automated data entry. However, if there is no match, default content, no content, or an error message may be presented in the field, which is not helpful. Accordingly, there is a need in the art for improved content identification.

SUMMARY

According to one aspect, a method includes receiving an organization identifier and transaction description, retrieving an entity embedding comprising a vector for each entity of an organization based on the organization identifier, invoking a machine learning model with the entity embedding and the description, wherein the machine learning model is trained to infer a transaction embedding from the description and compute a similarity score between the transaction embedding and each vector of the entity embedding, and returning a candidate entity with a similarity score that satisfies a threshold.

According to another aspect, a method includes receiving positive labeled training data comprising historical user feedback including a user-selected entity for a transaction and negative labeled training data comprising historical user feedback and a randomly selected entity different from the user-selected entity, training a language model with the positive and negative labeled training data to generate embeddings, invoking the language model on a set of entities associated with an organization generating entity embeddings, and saving the entity embeddings to a key-value store, wherein an organization identifier is the key.

Other aspects provide processing systems configured to perform the aforementioned methods as well as those described herein; non-transitory, computer-readable media comprising instructions that, when executed by a processor of a processing system, cause the processing system to perform the aforementioned methods as well as those described herein; a computer program product embodied on a computer-readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The appended figures depict certain aspects and are, therefore, not to be considered limiting of the scope of this disclosure.

To facilitate understanding, identical reference numerals have been used, where possible, to designate identical elements common to the drawings. It is contemplated that elements and features of one embodiment may be beneficially incorporated in other embodiments without further recitation.

DETAILED DESCRIPTION

Figure 1:
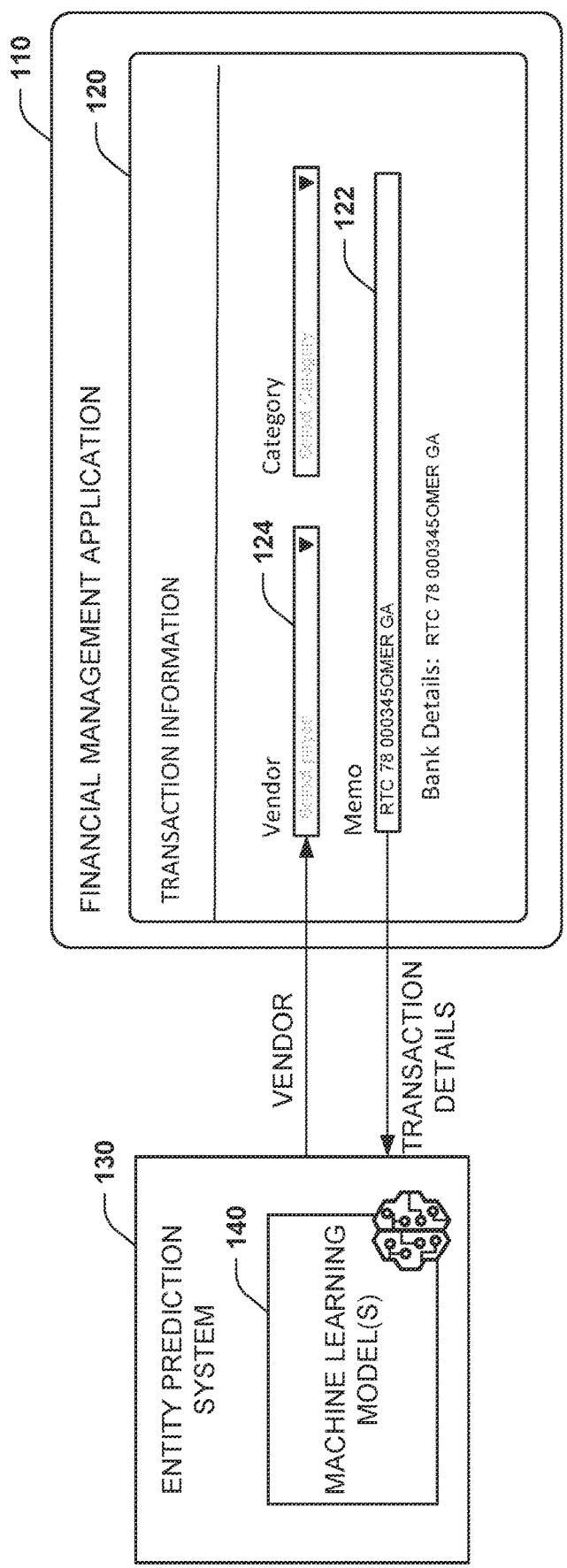
FIG. 1 is a block diagram of a high-level overview of an example implementation of automated data entry prediction of transaction entities.

Aspects of the subject disclosure provide apparatuses, methods, processing systems, and computer-readable mediums for predicting a transaction entity based on learned embeddings. Predicting entities for transactions allows for improving software applications, such as by enabling automated data entry into fields of an application, which saves time and reduces errors, among other things. Traditionally, matching entities to transactions relied on text string matching techniques, including fuzzy matching techniques. However, such techniques are highly sensitive to transaction data including exact or near word matches. For example, a matching entity for a transaction will not be found if the transaction data does not include an exact or very similar entity name. Such information is regularly omitted or distorted (e.g., truncated) in transaction information based on the underlying systems handling the transaction and reporting its data.

Thus, a technical problem exists concerning performant identification of an entity associated with a transaction. This underlying technical problem creates related technical problems, such as with software-based automated data entry (e.g., automatic field filling or completion). Aspects described herein provide a technical solution to the aforementioned technical problem, which involves training a machine learning model to identify an entity based on context information associated with a transaction, and not mere word matching as in conventional techniques. The trained machine learning model thus exploits context information, for example in a transaction record, to perform improved entity identification, which is a beneficial technical effect. For example, such a trained machine learning model may be used to perform improved automated data entry in any application requiring data entry.

In some aspects, an embedding model produces embeddings for entities and transactions. The embedding for each individual entity may comprise, for example, a vector of numerical values in a multi-dimensional space in which dimensions represent features or attributes of an individual element in the context of an entity to transaction mapping. Similarly, a transaction embedding may comprise a vector of numerical values in a multi-dimensional space in which the dimensions represent features or attributes of the transaction in the context of an entity to transaction mapping. Thereafter, a comparison of a transaction embedding with entity embeddings enables predicting an entity associated with the transaction, and that predicted entity may then be used for automated data entry in some aspects.

Beneficially, capturing meaning and context information with embeddings produced by trained machine learning models results in improved matching performance between entities and transactions. Moreover, aspects described herein pre-embed entity information such that the matching process may be performed rapidly and automated data entry may be performed in real-time. The computational complexity of conventional word matching (and fuzzy matching) techniques generally precludes the possibility of real-time matching and automated data entry. Additional aspects described herein relate to further optimizations that improve matching speed, another beneficial technical effect. For example, candidate entities can be filtered to a subset of entities having a relation or association with the transacting entity. Further yet, dimensionality reduction techniques may be applied to embeddings generated by the machine learning models described herein to enable more efficient storage, faster retrieval, and faster matching with lower computational complexity.

Accordingly, aspects described herein provide many beneficial technical effects compared to conventional matching techniques and provide a technical solution to extant technical problems in the art.

Example Implementation of Automated Data Entry Prediction of Transaction Entities FIG. 1 depicts a high-level overview of an example implementation of aspects for the subject disclosure associated with automated data entry prediction of transaction entities. The implementation includes a financial management application 110 and transaction information window 120.

The financial management application 110 can correspond to a digital accounting book or other collection of financial transactions. For example, a financial management application 110 can include a chart of accounts that lists accounts a business uses to record financial transactions such as income and expenses. In this instance, the chart of accounts can provide a framework for maintaining accurate financial records. In accordance with one embodiment, financial management application 110 can be communicatively coupled to a financial institution server in a manner that permits access to recorded transactions.

The transaction information window 120 is a graphical interface mechanism for receiving transaction information. Per one embodiment, the transaction information can include bank details in a memo field 122. In some applications, such as accounting applications, a vendor is required for a transaction to be considered complete and compliant for tax and auditing purposes. The vendor field 124 accepts user input manually specifying the entity. According to certain aspects, vendor field 124 can correspond to a drop-down menu listing of previously specified vendors as manual selection options.

Entity prediction system 130 is configured to interact with the transaction information window 120 within the financial management application 110. More specifically, the entity prediction system 130 can receive a transaction description of details, including but not limited to, bank details specified in memo field 122. The entity prediction system 130 can invoke one or more machine learning models 140 with the transaction description. A machine learning model 140 can generate a representation of the transaction that captures meaning and context. Utilizing that same machine learning model, a different machine learning model, or other process, the transaction representation can compare to a similar representation for vendors that can be computed in advance. The comparison can generate a similarity score for the transaction and each vendor. The vendor with the highest similarity score can be output as a predicted or candidate vendor. The entity prediction system 130 can transmit the candidate vendor to the transaction information window 120, for instance, by way of an application programming interface (API), to fill in the vendor field 124 or otherwise suggest or recommend the candidate vendor. For example, the candidate vendor can be presented outside the vendor field 124 or as a tooltip upon hovering over the vendor field 124. In another scenario, the candidate vendor can be highlighted in a drop-down menu list of vendors for selection.

In accordance with certain aspects, the machine learning model 140 can correspond to an embedding machine learning model 140 that generates embeddings for vendors and transactions. The embeddings can capture features such as context information or meaning associated with vendors and transactions. In one embodiment, a single machine learning model can be employed that produces embeddings, computes similarity scores, and selects a vendor to output based on the similarity score. In another embodiment, multiple machine learning models can be employed. For example, a first machine learning model 140 can generate embeddings, and a second machine learning model can predict a vendor for a transaction based on the embeddings. In some cases, a vendor may only be identified when confidence in the prediction is greater than a threshold, when similarity between the vendor embedding and the transaction embedding is high enough, or the like. In other words, where a match predicted by a machine learning model 140 is weak based on some metric, the match may not be provided to a user or application, such as financial management application 110.

Transaction description can correspond to bank details presented in memo field 122. As shown, the bank details are "RETCH 78 0003450MER GA." Here, the bank details are coded or do not explicitly specify an entity name. Thus, a text-string matching approach seeking to match each of the sequences "RTC," "78," "0003450MER," and "GA" to an entity is likely to either fail or misidentify an entity. However, utilizing context information following "RTC," a trained machine learning model 140 can identify the entity as "RaceTrac," a gas station and convenience store. For example, the prediction can be made based on embeddings that capture features, attributes, or properties (e.g., location) associated with the transaction and potential matching vendors. Context information such as the location (e.g., GA) and store number (e.g., 78) can be captured in embeddings and utilized as a basis to compute similarity. After the vendor is predicted, the predicted vendor can be suggested for data entry completion for vendor field 124.

Example System for Entity Prediction

Figure 2:
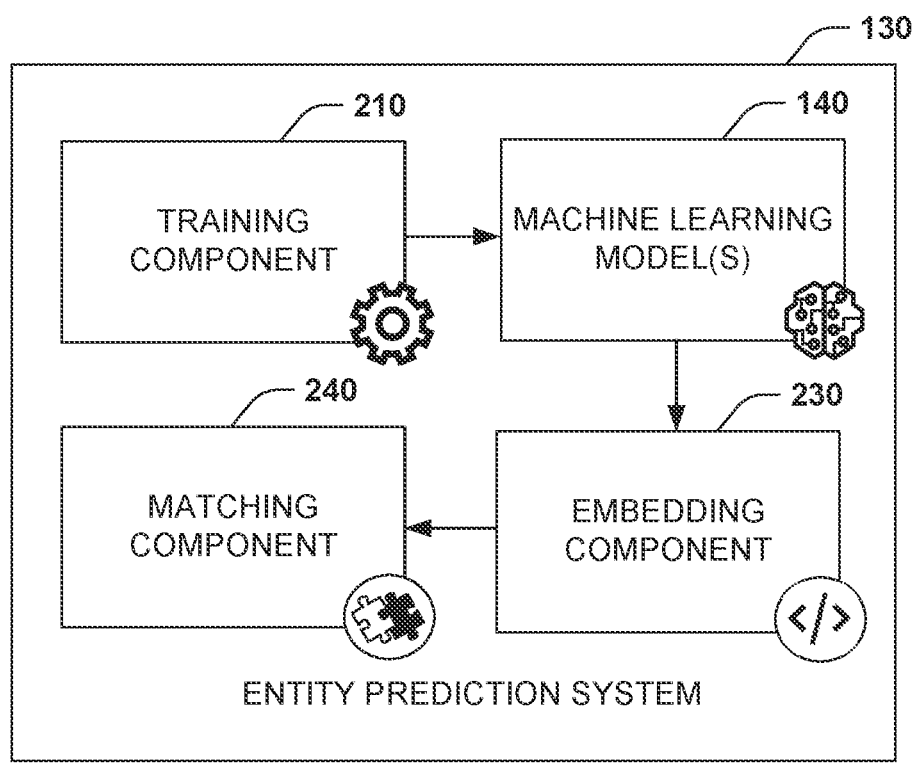
FIG. 2 is a block diagram of an example entity prediction system.

FIG. 2 illustrates a block diagram of an example implementation of the entity prediction system 130. The entity prediction system 130 includes training component 210, machine learning model(s) 140, embedding component 230, and matching component 240. The training component 210, machine learning model(s) 140, embedding component 230, and matching component 240 can be implemented by a processor (e.g., processor 1202 of FIG. 12) coupled to a memory (e.g., memory 1212 of FIG. 12) that stores instructions that cause the processor to perform the functionality of each component when executed. Consequently, a computing device can be configured to be a special-purpose device or appliance that implements the functionality of the entity prediction system 130. Further, all or portions of the entity prediction system 130 can be distributed across computing devices or made accessible through a network service.

The training component 210 is configured to train one or more machine learning models 140. The training component 210 can train a machine learning model 140 with historical user feedback data regarding entity identification. For example, users may manually associate entities with transactions that become labeled data for supervised learning. In accordance with one aspect, the training component 210 can train an embedding machine learning model with historical user feedback data that produces embeddings for vendors and transactions. An embedding can be a representation of an entity or transaction that captures features or characteristics of an entity or transaction learned from historical data in a compact and useful form. The representation can be a vector of numerical values in a multi-dimensional space in which dimensions represent features or characteristics of an object being represented. In other words, an embedding captures the meaning and context of an object they represent. Embeddings can be input to another machine learning model or other processes, for example, to compute similarity scores.

Figure 3:
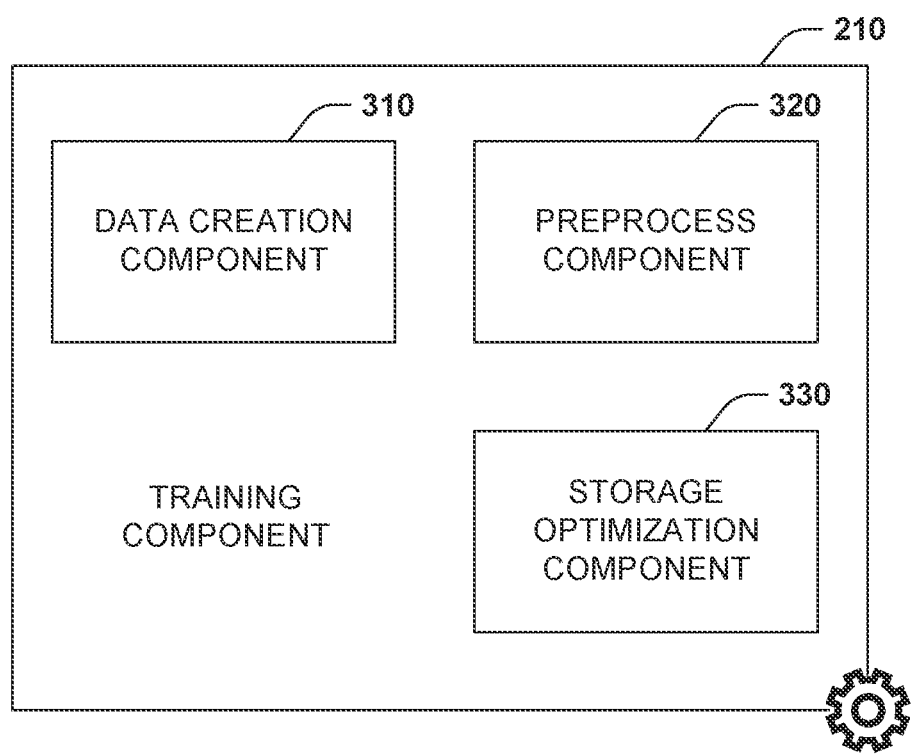
FIG. 3 is a block diagram of an example training component.

Turning attention to FIG. 3, an example training component 210 is illustrated in further detail. The training component 210 includes data creation component 310, preprocess component 320, and storage optimization component 330, all of which can be implemented by a processor (e.g., processor 1202 of FIG. 12) coupled to a memory (e.g., memory 1212 of FIG. 12) that stores instructions that cause the processor to perform the functionality of each component when executed.

The data creation component 310 is configured to create training data for a machine learning model. For example, the data creation component 310 can receive, retrieve, or otherwise obtain historical user interaction data. The data can include a transaction description and a manually specified entity associated with the transaction description. This data can be referred to as positive labeled training data. The data creation component 310 can also acquire or generate negative labeled training data in which the identified entity is incorrect for the transaction description. In one embodiment, the data acquisition component can use positive labeled training data and randomly select a different entity to produce the negative labeled training data. In other words, positive-labeled training data can be used as the basis of synthetic negative-labeled training data.

The preprocess component 320 is configured to improve the quality of training data acquired by the data creation component 310. For example, irrelevant keywords or phrases can be removed from the transaction description. The preprocess component 320 can compute a score for keywords or phrases. For instance, term frequency-inverse document frequency (TF-IDF) can be employed to compute a relevancy score. Keywords or phrases with the lowest score can be removed as irrelevant. Further, the preprocess can optionally remove terms with very high relevancy scores that are not informative of an entity name, such as check number, transaction number, or the like, in the context of a financial transaction. Removal of irrelevant or unimportant keywords as well as transaction unique keywords from the transaction description by the preprocess component 320 can reduce the time and computing resources required to train a machine learning model as well as improve the performance of the machine learning model.

The storage optimization component 330 is configured to reduce the size of an embedding vector produced by an embedding machine learning model. An optimization process can be executed by the storage optimization component 330 that finds the smallest size embedding without significantly reducing model performance. For example, the embedding vector size might be reduced by more than half without impacting model performance, e.g., compared to some task performance threshold. This optimization process may include, for example, dimensionality reduction or compression in which the number of dimensions characterizing a transaction or entity can be reduced. The optimization can reduce the storage space required to store embeddings as well as improve retrieval and processing speed.

Returning to FIG. 2, one or more machine learning models 140 can be produced with training data and processing by the training component 210. One machine learning model can be employed to provide aggregate prediction functionality. In an alternate embodiment, generation of embeddings and predicting a matching entity can be split across machine learning models. In one embodiment, a machine learning model can be generated from scratch without relying on any previous model. In another embodiment, a pre-existing machine learning model, such as a natural language processing (NLP) model, can be trained, fine-tuned, or updated for entity identification. For example, a pre-existing large language model (LLM) such as BERT (Bidirectional Encoder Representations from Transformers) can be utilized as a base model that is fine-tuned for entity prediction with historical user interaction data.

The embedding component 230 is configured to produce and store embeddings for vendors. In certain aspects, an organization, such as a company, can be associated with a set of vendors based on previous interactions. For each entity in an entity list associated with an organization, the embedding component 230 can invoke (e.g., trigger execution) the machine learning model 140 to produce the respective embedding and save the embedding to a data store. The embedding component 230 provides for predetermining entity embeddings to optimize processing and response time and enable real-time or near-real-time entity identification in a production environment. In an alternative embodiment, the entity embeddings could be determined when a call is made to predict an entity, but by preprocessing the entities and storing them, they can be quickly accessed, and overall speed is improved. Further, using a high-speed database for these embeddings can further improve response time.

Figure 4:
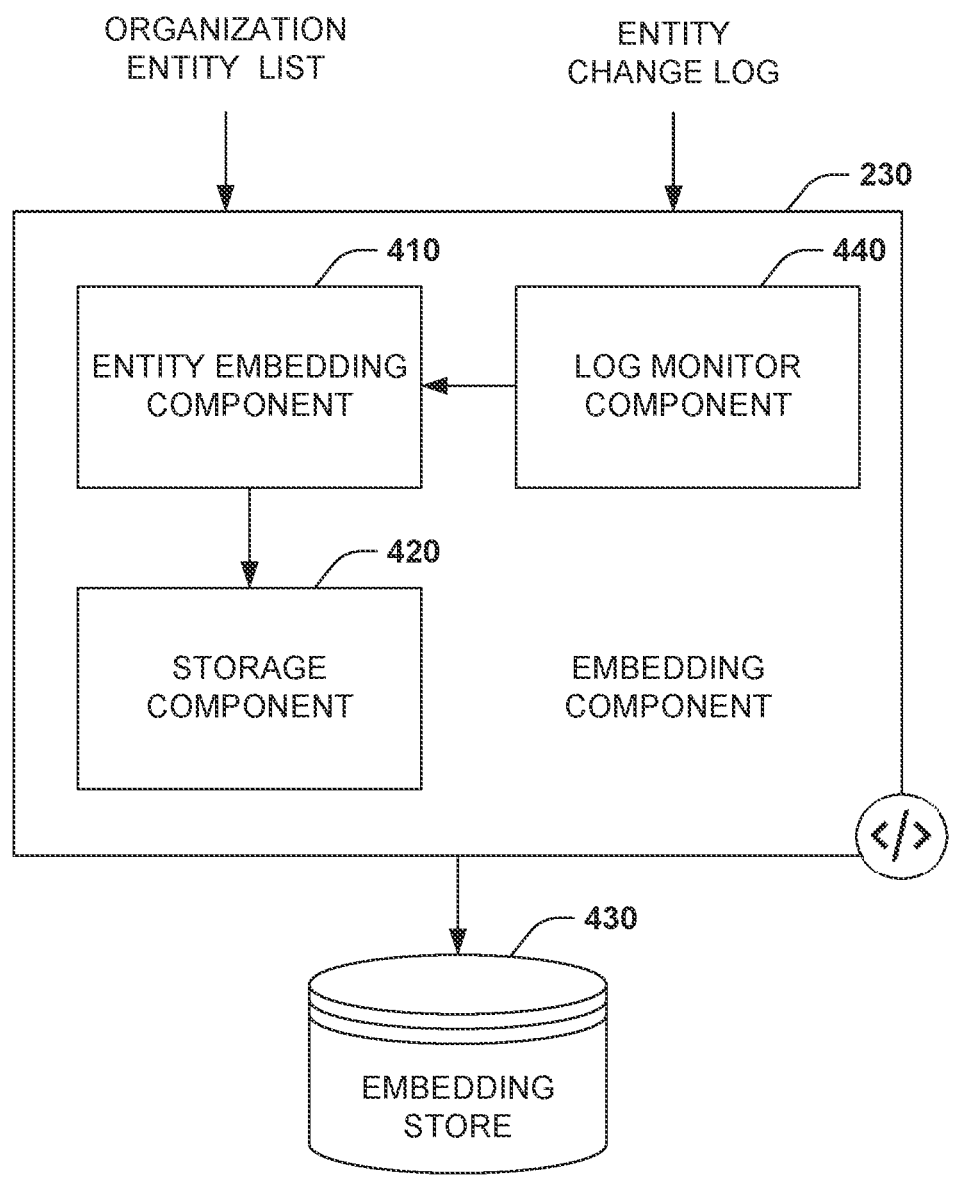
FIG. 4 is a block diagram of an example embedding component.

FIG. 4 illustrates an example embedding component 230 in further detail. The embedding component includes entity embedding component 410, storage component 420, and log monitor component 440. Further, the embedding component 410 can receive an entity list that specifies entities associated with a particular organization and entity change log and can save embeddings to embedding store 430.

The entity embedding component 410 is configured to generate embeddings for vendors in an organization entity list by invoking a trained embedding machine learning model. Although not limited thereto, in one implementation, a distributed processing system (e.g., Apache Spark®) can be employed to execute the entity embedding component 410.

The storage component 420 is configured to interact with the embedding store 430 to save embeddings generated by the entity embedding component 410. The embedding store can be a non-volatile data store that can store embeddings for later retrieval and use. In one embodiment, the embedding store 430 can correspond to a key-value store in which an organization identifier can serve as the key to entity embeddings. Further, in another embodiment, the storage component 420 can decouple data creation from storage. For instance, a publish/subscribe model or event streaming can be utilized. The storage component 420 can publish entity embeddings that are subsequently saved to the embedding store 430. In this manner, generating embeddings for vendors in the entity list is not slowed or constrained by storage of an embedding. In one implementation, a distributed event store and stream processing system (e.g., Kafka®) can be employed by the storage component 420.

The organization entity list need not be static. Rather, an organization can manually specify additional entities over time as relationships evolve. The organization entity list can be updated to include additional entities. If an entity is added after an organization entity list is processed by the embedding component 230, the new entity can be added to an entity change log. The log monitor component 440 is configured to monitor the entity change log for updates and trigger the embedding generation by the entity embedding component 410. The entity change log can also reflect removal of an entity from the organization list, for example, if replaced by a new entity. The log monitor 440 can also identify this change and cause the removal of a corresponding entity embedding from the embedding store 430.

Returning to FIG. 2, the matching component 240 is configured to predict an entity that matches the transaction and output the entity. The matching component can receive or retrieve entity embeddings from the embedding component 230 or the embedding store 430 based on an organization identifier, for example, that is included with a request. The matching component 240 can also trigger generation of a transaction embedding. The matching component 240 can subsequently compute similarity scores between the transaction embedding and each entity embedding. The entity associated with the greatest similarity score can be identified. If the similarity score satisfies a threshold, the entity can be deemed a match and output as a candidate entity for the transaction.

Figure 5:
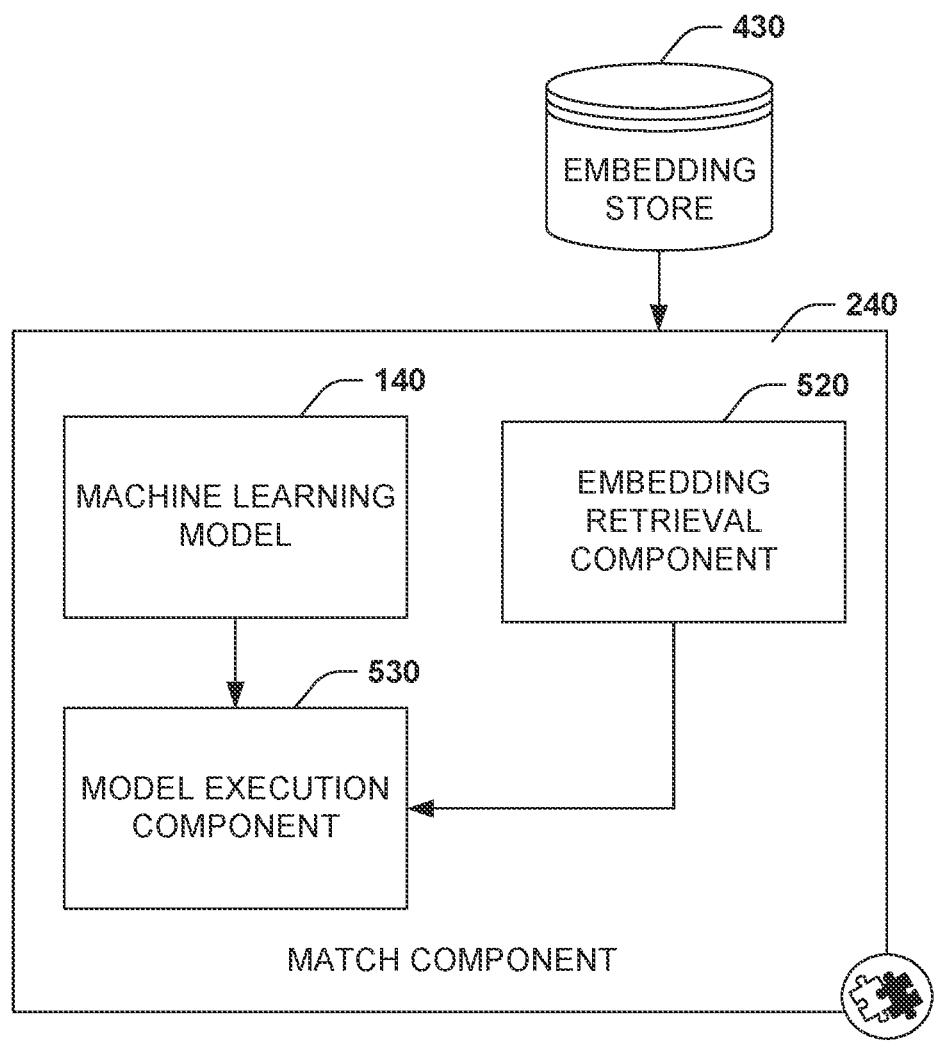
FIG. 5 is a block diagram of an example matching component.

FIG. 5 depicts an example matching component 240 in further detail. The matching component 240 includes embedding retrieval component 520, machine learning model 140, and model execution component 530. In this embodiment, the model execution component 530 is configured to execute a machine learning model 140 trained to generate embeddings, predict an entity associated with a transaction, and output the entity name. A request can include an organization identifier in various embodiments. The embedding retrieval component 520 is configured to retrieve entity embeddings (e.g., determined before the retrieval request) from the entity embedding store 430 by utilizing the organization identifier as a key to look up the entity embeddings. The model execution component 530 can receive these entity embeddings and compare them to a transaction embedding to identify a match based on a similarity score and a predetermined similarity score threshold.

Figure 6:
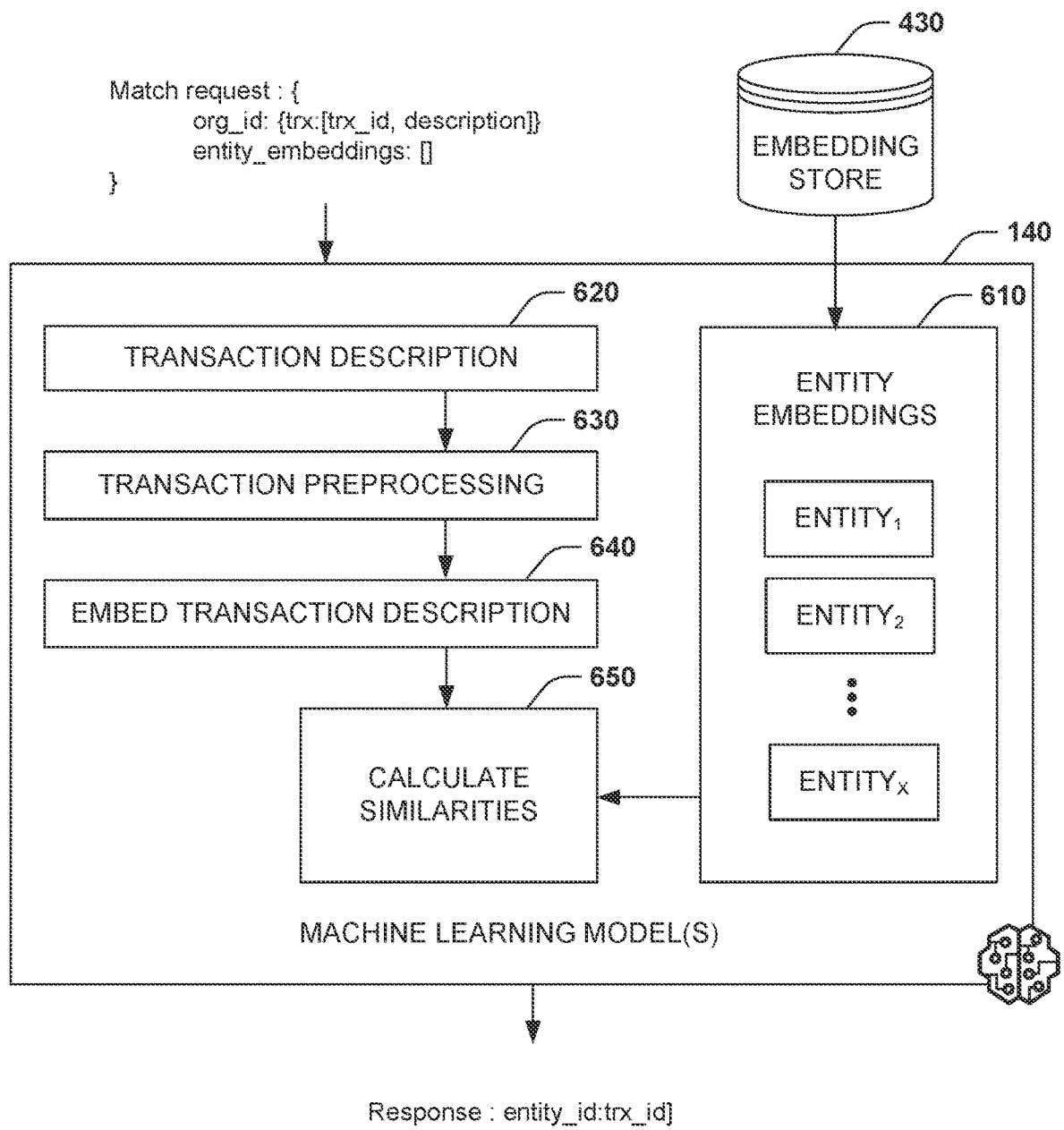
FIG. 6 is a block diagram of an example machine learning model configured to predict an entity based on a transaction description.

Referring to FIG. 6, an example machine learning model 140 is depicted that produces a candidate entity for a transaction in response to a match request. A match request can include an organization identifier, transaction description, and optionally corresponding entity embeddings 610 for the organization. If the embeddings are not provided, the organization identifier can be utilized as a key to look up and retrieve the entity embeddings 610 from the embedding store 430. The entity embeddings include an embedding for each of a set of entities including $ENTITY_1$-$ENTITY_X$ where "X" is an integer greater than one. Transaction description 620 can be received from a match request and, in one embodiment, represents content in a transaction memo field. Transaction preprocessing 630 can be performed at 630. For example, keywords and phrases can be evaluated for relevancy or importance using TF-IDF, and irrelevant (e.g., low relevance score) and optionally transaction unique (e.g., very high relevance score) keywords can be removed from the transaction description. The machine learning mode 140 can produce an embedding for the transaction description at 640. Next, at 650, the machine learning model 140 calculates similarities between the transaction embedding and each entity embedding. The machine learning model 140 can output an entity identifier that has the highest similarity score with respect to the transaction embedding. Further, a threshold can be utilized to prevent identifying an entity unless it achieves a minimum level of similarity.

Example Descriptions and Entity Predictions

Figure 7:
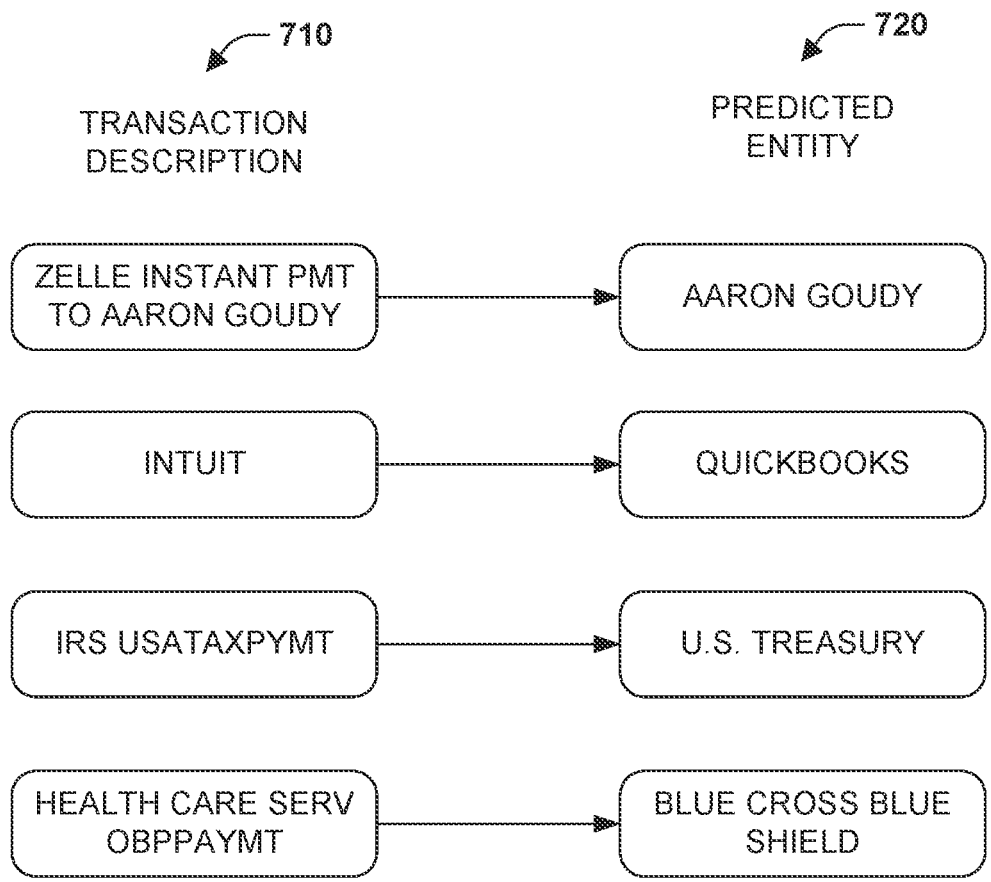
FIG. 7 illustrates sample descriptions and entity predictions.

FIG. 7 illustrates sample descriptions and entity predictions. Given a transaction description 710, entity prediction system 130 of FIG. 1 can produce a predicted entity 720. As an example, from the transaction description 710 of "ZELLE INSTANT PMT TO ARRON GOUDY" the entity prediction system 130 can produce a predicted entity 720 of "Aaron Goudy." This is a relatively simple match, as the entity's name is included in the transaction description. Others are more complicated and utilize meaning and context to predict the entity. Examples include matches between "INTUIT" and "QUICKBOOKS," "IRS USATAXPAYMENT" and "U.S. TREASURY," and "HEALTH CARE SERV OBPPAYMT" and "BLUE CROSS BLUE SHIELD."

Example Methods of Entity Prediction

Figure 8:
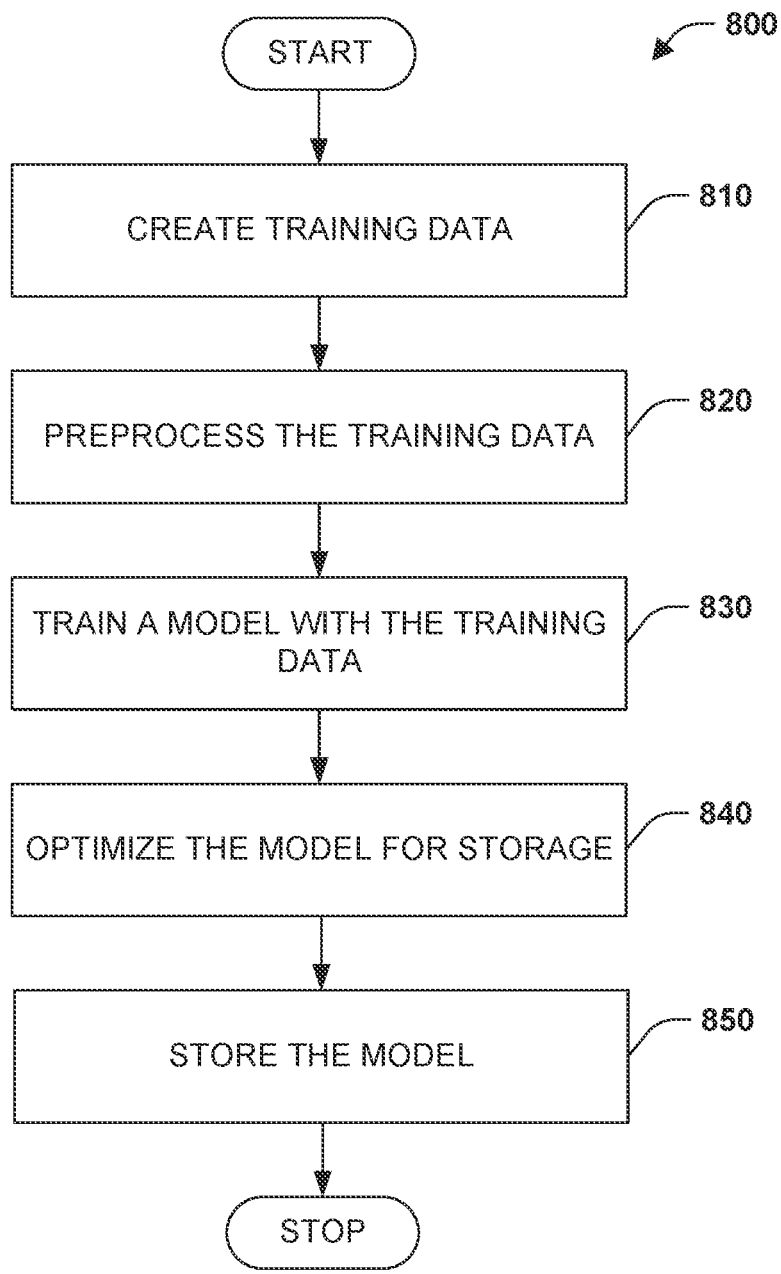
FIG. 8 is a flow chart diagram of an example method of training a machine learning model to produce embeddings.

FIG. 8 depicts an example method 800 of training a machine learning model to predict an entity associated with a transaction. In one aspect, method 800 can be implemented by entity prediction system 130 including training component 210 to produce a model such as machine learning model 140.

Method 800 starts at block 810 with creating training data. Training data can comprise historical user interactions associated with transactions and specified entities. In one aspect, creating training data can comprise selecting and acquiring the training data. This training data can correspond to positive labeled training data since the entities match correctly for transactions. Creating training data can also involve generating negative labeled training data in which the entities do not correctly match for transactions. In one embodiment, the positive labeled training data can form the basis for negative labeled training data. For example, the entity in positive labeled training data can be changed to a different randomly selected entity.

Method 800 then proceeds to block 820 with preprocessing the training data produced at block 810. Preprocessing improves the quality of training data. For example, irrelevant keywords or phrases can be removed from the transaction description. A relevancy or importance score can be computed for keywords or phrases, for instance, using term frequency-inverse document frequency (TF-IDF). Keywords or phrases with the lowest score, or scores below a minimum threshold, can be removed as irrelevant. Further, the preprocessing can optionally remove transaction unique terms with remarkably high relevancy scores, such as check number, transaction number, or the like. Removal of irrelevant or unimportant keywords as well as transaction unique keywords from the transaction description can reduce the time and computing resources required to train a machine learning model as well as improve the performance of the machine learning model.

Method 800 continues to block 830 with training a model with the training data. In some embodiments, such training can correspond to fine-tuning a pre-existing language model with the training data. A pre-existing machine learning model, such as a natural language processing (NLP) model, can be trained, fine-tuned, or updated for entity prediction utilizing the training data. For example, a pre-existing large language model (LLM) such as BERT (Bidirectional Encoder Representations from Transformers) can be utilized as a base model that is fine-tuned for entity identification with historical user interaction data. In accordance with one aspect, a pre-existing machine learning model can be adapted to generate embeddings.

Method 800 then proceeds to block 840 with optimizing the model for storage. Storage optimization can reduce the size of an embedding vector produced by an embedding machine learning model. An optimization process can be executed that finds the smallest size embedding without reducing model performance beyond a threshold. For example, the embedding vector size might be reduced by more than half without impacting model performance beyond the threshold. This optimization process can also be called dimension reduction, as the number of dimensions characterizing a transaction or entity can be reduced. The optimization can reduce the space required to store embeddings as well as improve retrieval and processing speed.

Method 800 then advances to block 850 with storing the machine learning model. The machine learning model can be stored to permit subsequent invocation and execution with respect to identification of an entity associated with an input transaction.

Figure 9:
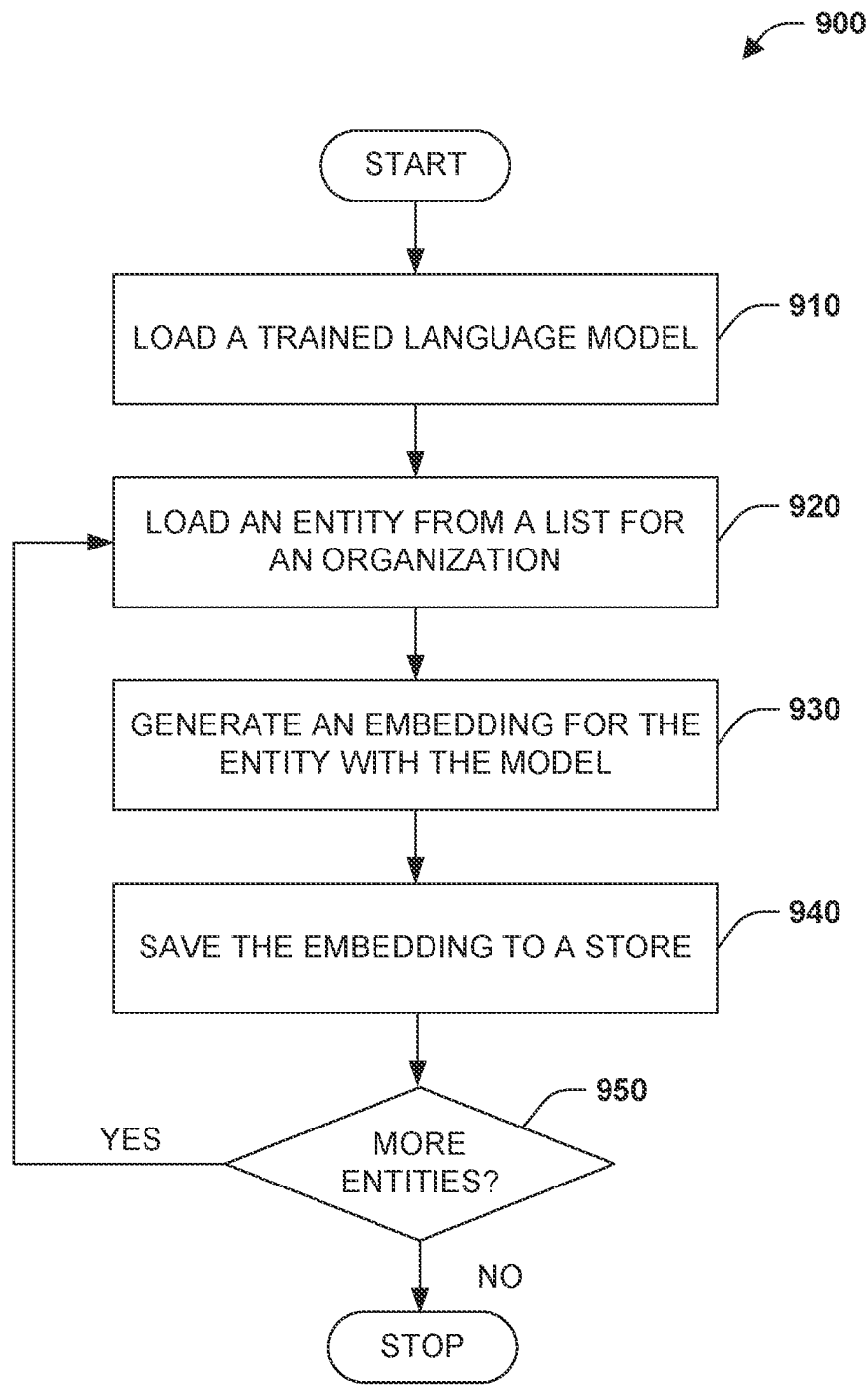
FIG. 9 is a flow chart diagram of an example method of entity embedding.

FIG. 9 is a flow chart diagram of method 900 of entity encoding. In one aspect, method 900 can be implemented by entity prediction system 130 including the embedding component 230, as described above with respect to FIGS. 1 and 2, respectively. The entity encoding can correspond to preprocessing activity to increase processing speed with respect to live input.

Method 900 starts at block 910 with loading a trained machine learning model. In one instance, the machine learning model can be a language model, but other types of models can be utilized. The machine learning model can correspond to an embedding machine learning model trained with training data that captures historical transaction interaction including manual specification of a corresponding entity. In one implementation, loading can correspond to loading the trained model within a distributed processing system.

Method 900 proceeds to block 920 with loading an entity from a list of entities associated with an organization. An entity list or set can be generated based on past interactions and manual specification of entities associated with transactions for a particular organization, such as a company or individual, among others. An entity is loaded from this list for subsequent processing. In one implementation, an entity can be loaded within a distributed processing system to permit subsequent large-scale processing across multiple nodes in a cluster or network.

Method 900 continues at block 930 with generating an embedding for the entity with the model. The embedding can be a representation of an entity that captures features or characteristics of an entity or transaction learned from historical data in a compact and useful form. The representation can be a vector of numerical values in a multi-dimensional space in which dimensions represent features or attributes of an object being represented.

Method 900 then proceeds to block 940 with saving the generated embedding to a store, such as embedding store 430 in FIG. 4. In accordance with one embodiment, the embedding can be saved to a key-value store in which an organization identifier is the key, and the embedding is the value. In another embodiment, saving the embedding to a store can be implemented in a manner that decouples generation of the embedding from storage of the embedding. For instance, a publish/subscribe model or event streaming can be utilized. Saving can then involve publishing an entity embedding which is subsequently saved to an embedding store. In this manner, generating embeddings for entities in the organization entity list is not slowed or constrained by storage of an embedding. In one implementation, a distributed event store and stream processing system can be employed.

Method 900 then proceeds to block 950 with determining whether there are more entities to process. The determination can be based on whether all entities in an entity set, or list have been processed. If there are more entities ("YES"), then method 900 loops back to block 920 with loading the next entity from the list. If no more entities exist ("NO"), then method 900 terminates.

Figure 10:
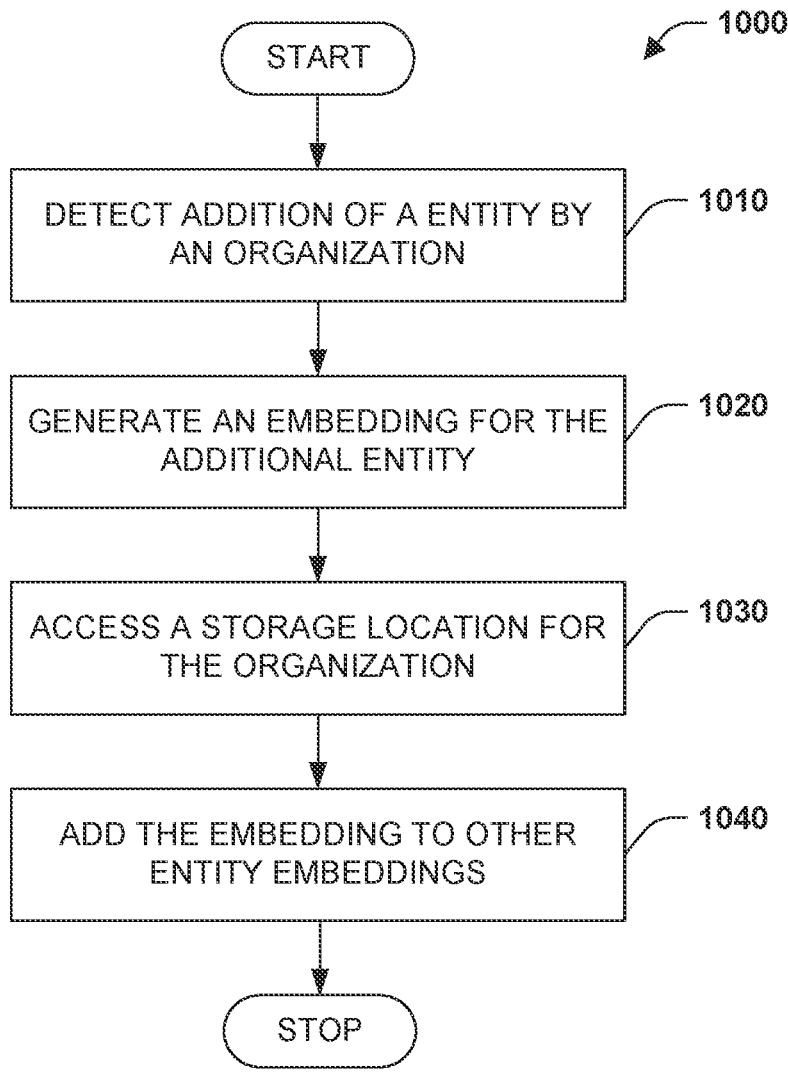
FIG. 10 is a flow chart diagram of an example method of updating an entity embedding.

FIG. 10 is a flow chart diagram of method 1000 of updating a set of entity embeddings. In one aspect, method 900 can be implemented by entity prediction system 130 including the embedding component 230, as described above with respect to FIGS. 1 and 2, respectively.

Method 1000 starts at block 1010 with detecting addition of an entity by an organization. In accordance with one embodiment, an entity list associated with an organization, such as a company or individual, can change. A log can be maintained to identify changes, such as adding an entity. This change log can be monitored to detect the addition.

Method 1000 then proceeds to block 1020 with generating an embedding for the additional entity. The embedding can be produced in a comparable manner to previous entity embeddings by invoking an embedding machine learning model on the entity.

Method 1000 then continues to block 1030 and 1040 with accessing a storage location for the organization and adding the embedding to other entity embeddings for the organization.

Figure 11:
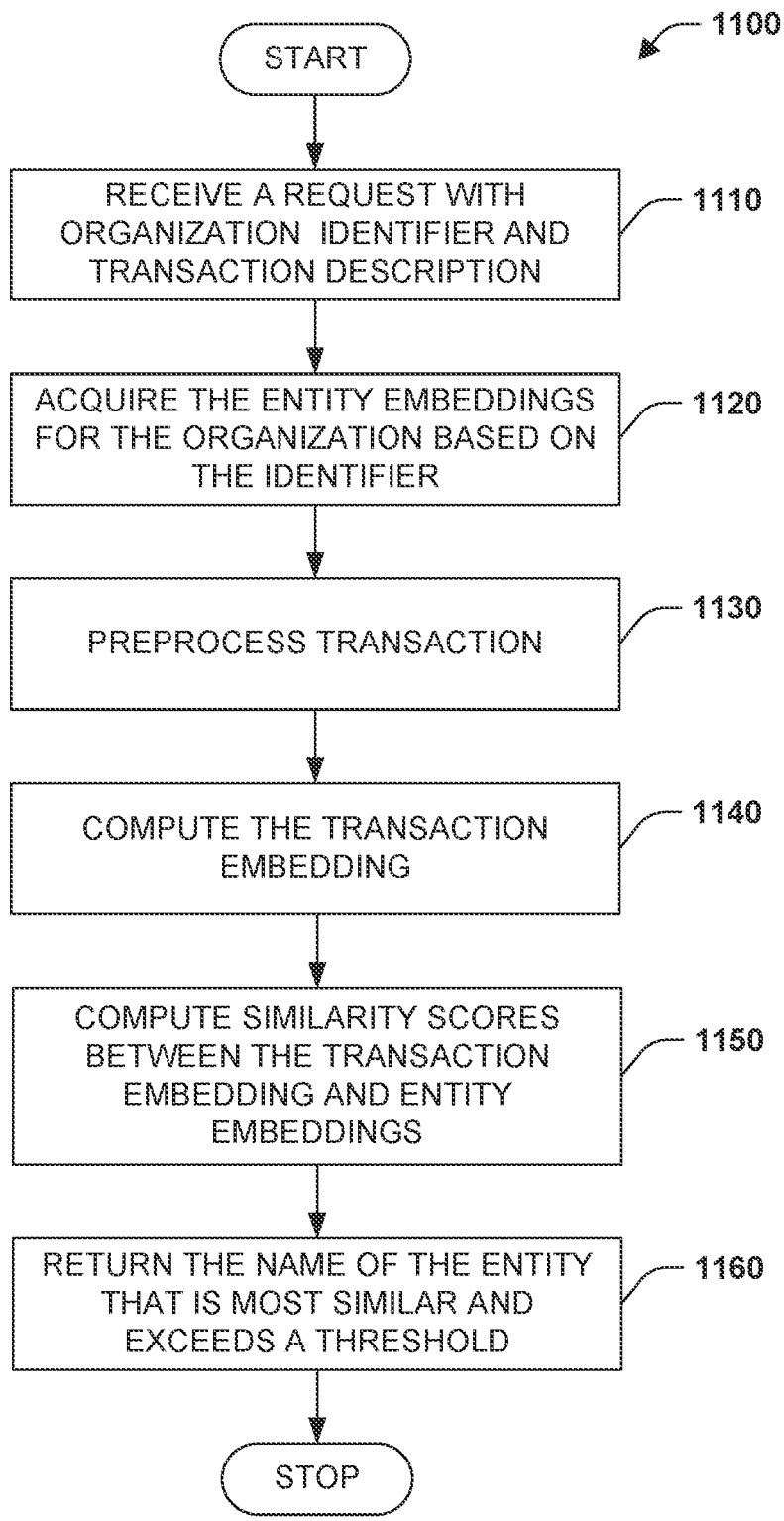
FIG. 11 is a flow chart diagram of an example matching method using a trained machine learning model.

FIG. 11 is a flow chart diagram of method 1100 of entity matching. In one aspect, the method 1100 can be implemented by the entity prediction system 130 and, more specifically, the matching component 240. In an alternative implementation, method 1100 can be implemented by a machine learning model.

Method 1100 starts at block 1110 with receiving a request with an organization identifier and transaction description. In certain aspects, this request can be provided in response to the opening of a transaction information window of a graphical user interface that requests specification of an entity for a transaction.

Method 1100 then proceeds to block 1120 with acquiring entity embeddings for the organization based on the organization identifier. In one embodiment, entity embeddings can be preprocessed and stored in a key-value store. The organization identifier can correspond to the key that can be utilized to locate the values, which are the entity embeddings.

Method 1100 then continues to block 1130 with preprocessing the transaction. The transaction can include a payee description, for example, located in a memo field for the transaction, such as memo field 122 in FIG. 1. This and other transaction description data can be preprocessed to remove irrelevant keywords or phrases as well as to remove any transaction unique keywords or phrases which are not informative of an entity name, such as a check or transaction number.

Method 1100 then proceeds to block 1140 with computing a transaction embedding. An embedding machine learning model can be invoked with the transaction description data, and an embedding can be generated comprising a vector that represents meaning and context.

Method 1100 then continues to block 1150 with computing similarity scores between the transaction embedding and entity embeddings. In one embodiment, cosine similarity can be utilized to measure the similarity between embedding vectors.

Method 1100 then proceeds to block 1160 with returning an entity that is most similar to the transaction and exceeds a similarity threshold. Returning an entity corresponds to returning an entity name as a candidate match for the transaction.

Example Processing System for Entity Prediction

Figure 12:
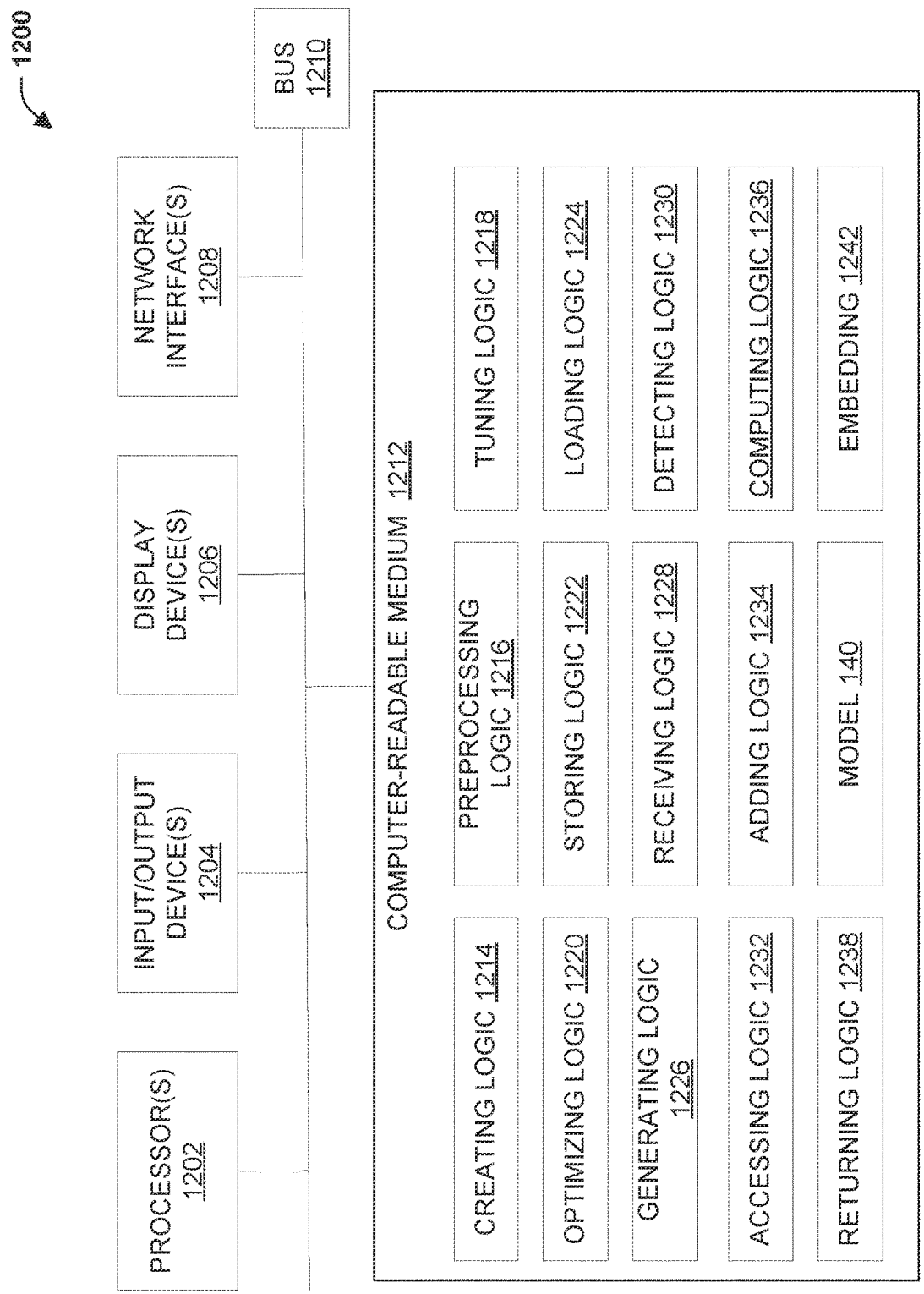
FIG. 12 is a block diagram of an operating environment within which aspects of the subject disclosure can be performed.

FIG. 12 depicts an example processing system 1200 configured to perform various aspects described herein, including, for example, methods as described above with respect to FIGS. 8-11.

Processing system 1200 is generally an example of an electronic device configured to execute computer-executable instructions, such as those derived from compiled computer code, including without limitation personal computers, tablet computers, servers, smart phones, smart devices, wearable devices, augmented or virtual reality devices, and others.

In the depicted example, processing system 400 includes one or more processors 1202, one or more input/output devices 1204, one or more display devices 1206, and one or more network interfaces 1208 through which processing system 1200 is connected to one or more networks (e.g., a local network, an intranet, the Internet, or any other group of processing systems communicatively connected to each other), and computer-readable medium 1212.

In the depicted example, the aforementioned components are coupled by a bus 1210, which may generally be configured for data and/or power exchange amongst the components. Bus 1210 may be representative of multiple buses, while only one is depicted for simplicity.

Processor(s) 1202 are generally configured to retrieve and execute instructions stored in one or more memories, including local memories like the computer-readable medium 1212, as well as remote memories and data stores. Similarly, processor(s) 1202 are configured to retrieve and store application data residing in local memories like the computer-readable medium 1212, as well as remote memories and data stores. More generally, bus 1210 is configured to transmit programming instructions and application data among the processor(s) 1202, display device(s) 1206, network interface(s) 1208, and computer-readable medium 1212. In certain embodiments, processor(s) 1202 are included to be representative of one or more central processing units (CPUs), graphics processing units (GPUs), tensor processing units (TPUs), accelerators, and other processing devices.

Input/output device(s) 1204 may include any device, mechanism, system, interactive display, and/or various other hardware components for communicating information between processing system 1200 and a user of processing system 1200. For example, input/output device(s) 1204 may include input hardware, such as a keyboard, touch screen, button, microphone, and/or other device for receiving inputs from the user. Input/output device(s) 1204 may further include display hardware, such as, for example, a monitor, a video card, and/or other another device for sending and/or presenting visual data to the user. In certain embodiments, input/output device(s) 1204 is or includes a graphical user interface.

Display device(s) 1206 may generally include any device configured to display data, information, graphics, user interface elements, and the like to a user. For example, display device(s) 1206 may include internal and external displays, such as an internal display of a tablet computer or an external display for a server computer or a projector. Display device(s) 1206 may further include displays for devices, such as augmented, virtual, and/or extended reality devices.

Network interface(s) 1208 provide processing system 1200 with access to external networks and thereby to external processing systems. Network interface(s) 1208 can generally be any device capable of transmitting and/or receiving data through a wired or wireless network connection. Accordingly, network interface(s) 1208 can include a communication transceiver for sending and/or receiving any wired and/or wireless communication. For example, Network interface(s) 1208 may include an antenna, a modem, a LAN port, a Wi-Fi card, a WiMAX card, cellular communications hardware, near-field communication (NFC) hardware, satellite communication hardware, and/or any wired or wireless hardware for communicating with other networks and/or devices/systems. In certain embodiments, network interface(s) 1208 includes hardware configured to operate in accordance with the Bluetooth® wireless communication protocol.

Computer-readable medium 1212 may be a volatile memory, such as a random access memory (RAM), or a non-volatile memory, such as non-volatile random access memory, phase change random access memory, or the like. In this example, computer-readable medium 1212 includes creating logic 1214, preprocessing logic 1216, tuning logic 1218, optimizing logic 1220, storing logic 1222, loading logic 1224, generating logic 1226, receiving logic 1228, determining logic 1230, accessing logic 1232, adding logic 1234, computing logic 1236, returning logic 1236, model 1240 and embedding 1242.

In certain embodiments, creating logic 1214 creates training data. For example, historical data can be collected, and negative labeled training data can be created from positive labeled training data. The data creation component of FIG. 3 can perform the creating logic.

In certain embodiments, preprocessing logic 1216 improves the quality of training data. The preprocess component 320 of FIG. 3 can perform the preprocessing logic 1216.

In certain embodiments, tuning logic 1218 adapts a pre-existing model based on particular training data. The training component 210 of FIG. 2 can perform the tuning logic.

In certain embodiments, optimizing logic 1220 can optimize a model for storage, for example, by reducing or compressing the number of dimensions of embedding vectors. The training component 210 of FIG. 2 can perform the optimizing logic 1220.

In certain embodiments, storing logic 1222 stores a model and model output (e.g., embedding) to a storage device. The entity prediction system 130 of FIGS. 1-2 can perform the storing logic 1222.

In certain embodiments, loading logic 1224 loads a machine learning model and embeddings into a processing system or memory. The loading logic 1224 can be performed by entity prediction system 130 of FIGS. 1-2.

In certain embodiments, generating logic 1226 generates an embedding for a transaction or entity. The generating logic can be performed by an embedding machine learning model 140 of FIGS. 1-2.

In certain embodiments, receiving logic 1228 can receive a request for a matching entity or entity. The receiving logic 1228 can be performed by entity prediction system 130 of FIGS. 1-2.

In certain embodiments, detecting logic 1230 can detect changes to entities, such as the addition of a new entity, for example, by monitoring a change log. The detecting logic can be performed by the log monitor component 440 as part of the embedding component 230 of FIG. 4.

In certain embodiments, accessing logic 1232 can navigate to a location in an embedding store for an organization for retrieval or addition of entity embeddings. The accessing logic can be performed. The accessing logic 1232 can be performed by entity prediction system 130 of FIGS. 1-2 and in one aspect by the embedding component 230.

In certain embodiments, adding logic 1234 can add an embedding to a location in a store. The adding logic 1234 can be performed by the entity prediction system 130 of FIGS. 1-2 and in one aspect by the embedding component 230.

In certain embodiments, computing logic 1236 can compute an embedding for an entity or transaction. The computing logic 1234 can be performed by the machine learning model 140 of at least FIGS. 1-2.

In certain embodiments, returning logic 1238 can return an entity name in response to a request. The returning logic 1238 can be performed by entity prediction system 130 of at least FIGS. 1-2.

In certain embodiments, the computer-readable medium 1212 can include a trained machine learning model 140 and one or more embedding 1242 produced by the machine learning model 140.

Note that FIG. 12 is just one example of a processing system consistent with aspects described herein, and other processing systems having additional, alternative, or fewer components are possible consistent with this disclosure.

Example Clauses

Implementation examples are described in the following numbered clauses:

Clause 1: A method, comprising: receiving an organization identifier and description associated with a transaction, retrieving an entity embedding comprising a feature vector for each entity of an organization based on the organization identifier, invoking a machine learning model with the entity embedding and the description, wherein the machine learning model is trained to infer a transaction embedding from the description and compute a similarity score between the transaction embedding and each feature vector of the entity embedding, and returning a candidate entity with a similarity score that satisfies a threshold Clause 2: The method of Clause 1, wherein returning the candidate entity further comprises returning the candidate entity with the highest similarity score that satisfies the threshold.

Clause 3: The method of Clauses 1-2, further comprising filling a field in a graphical user interface associated with the transaction with the candidate entity.

Clause 4: The method of Clauses 1-3, further comprising creating positive labeled training data comprising historical user feedback including a user-selected entity for a transaction and negative labeled training data comprising historical user feedback and a randomly selected entity different from the user-selected entity.

Clause 5: The method of Clauses 1-4, further comprising preprocessing the positive and negative labeled training data by computing a relevance score of one or more keywords in the description and removing at least one of the one or more keywords with the lowest relevance score and removing at least one of the one or more keywords with the highest relevance score.

Clause 6: The method of Clauses 1-5, further comprising training a language model with the positive and negative labeled training data.

Clause 7: The method of Clauses 1-6, wherein training the language model comprises updating a pre-existing language model, wherein the pre-existing language model is a bidirectional encoder representations from transformers (BERT) model.

Clause 8: The method of Clauses 1-7, further comprising: determining the smallest size the entity embedding can be without reducing model performance and constraining the model to utilize the smallest size of the entity embedding.

Clause 9: The method of Clauses 1-8, further comprising: detecting addition of a new entity, determining a feature vector for the new entity, and adding the feature vector to the entity embedding associated with the organization identifier.

Clause 10: The method of Clauses 1-9, further comprising: encoding the entity embedding for each entity of the organization and saving the entity embedding in a key-value store with the organization identifier as the key.

Clause 11: The method of Clauses 1-10, wherein saving the entity embedding further comprises decoupling data creation from storage by publishing the entity embedding to a stream with a subscriber storage application that receives the entity embedding and stores the entity embedding in the key-value store in accordance with a publish/subscribe model.

Clause 12: A training method, comprising: receiving positive labeled training data comprising historical user feedback including a user-selected entity for a transaction and negative labeled training data comprising historical user feedback and a randomly selected entity different from the user-selected entity, training a language model with the positive and negative labeled training data to generate embeddings, invoking the language model on a set of entities associated with an organization generating entity embeddings, and saving the entity embeddings to a key-value store, wherein an organization identifier is the key.

Clause 13: The method of Clause 12, further comprising preprocessing the positive and negative labeled training data by computing a relevance score of one or more keywords and removing at least one of the one or more keywords with the lowest relevance score and removing at least one of the one or more keywords with the highest relevance score.

Clause 14: The method of Clauses 12-13, further comprising: determining the smallest size the entity embedding can be without reducing model performance and reducing the entity embedding size to the smallest size before saving the embedding to the key-value store.

Clause 15: The method of Clauses 12-14, wherein training the language model comprises updating a pre-existing natural language model with the training data.

Clause 16: A processing system, comprising: a memory comprising computer-executable instructions; and a processor configured to execute the computer-executable instructions and cause the processing system to perform a method in accordance with any one of Clauses 1-15.

Clause 17: A processing system, comprising means for performing a method in accordance with any one of Clauses 1-15.

Clause 18: A non-transitory computer-readable medium storing program code for causing a processing system to perform the steps of any one of Clauses 1-15.

Clause 19: A computer program product embodied on a computer-readable storage medium comprising code for performing a method in accordance with any one of Clauses 1-15.

ADDITIONAL CONSIDERATIONS

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented, or a method may be practiced using any number of the aspects set forth herein. In addition, the scope of the disclosure is intended to cover such an apparatus or method practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later become known to those of ordinary skill in the art are expressly incorporated herein by reference and are intended to be encompassed by the claims. Moreover, nothing disclosed herein is intended to be dedicated to the public, regardless of whether such disclosure is explicitly recited in the claims.

What is claimed is:

1. A method, comprising:
   receiving an organization identifier and description associated with a transaction;
   retrieving an entity embedding comprising a vector for each entity of an organization based on the organization identifier from a data store, wherein the entity embedding is saved to the data store after being published to a stream with a subscriber storage application that enables stream processing and data storage in accordance with a publish/subscribe model;

invoking a machine learning model with the entity embedding and the description, wherein the machine learning model is trained to infer a transaction embedding from the description and compute a similarity score between the transaction embedding and each vector of the entity embedding; and returning a candidate entity with a similarity score that satisfies a threshold.

2. The method of claim 1, wherein returning the candidate entity further comprises returning the candidate entity with a highest similarity score that satisfies the threshold.

3. The method of claim 1, further comprising filling a field in a graphical user interface associated with the transaction with the candidate entity.

4. The method of claim 1, further comprising creating positive labeled training data comprising historical user feedback including a user-selected entity for a transaction and negative labeled training data comprising historical user feedback and a randomly selected entity different from the user-selected entity.

5. The method of claim 4, further comprising preprocessing the positive labeled training data and the negative labeled training data by computing a relevance score of one or more keywords in the description and removing at least one of the one or more keywords with a lowest relevance score and removing at least one of the one or more keywords with a highest relevance score.

6. The method of claim 5, further comprising training a language model with the positive labeled training data and the negative labeled training data.

7. The method of claim 6, wherein training the language model comprises updating a pre-existing language model, wherein the pre-existing language model is a bidirectional encoder representations from transformers (BERT) model.

8. The method of claim 6, further comprising:
determining a smallest size the entity embedding can be without reducing model performance below a performance threshold; and
constraining the machine learning model to utilize the smallest size of the entity embedding.

9. The method of claim 1, further comprising:
detecting addition of a new entity;
determining a vector for the new entity; and
adding the vector to the entity embedding associated with the organization identifier.

10. The method of claim 1, further comprising:
encoding the entity embedding for each entity of the organization; and
saving the entity embedding in a key-value store with the organization identifier as a key.

11. The method of claim 10, wherein saving the entity embedding further comprises decoupling data creation from storage by publishing the entity embedding to the stream with the subscriber storage application that receives the entity embedding and stores the entity embedding in the key-value store in accordance with the publish/subscribe model.

12. A system, comprising:
at least one processor;
at least one memory coupled to the at least one processor that includes instructions, that, when executed by the at least one processor, cause the processor to:
retrieve an entity embedding comprising a vector for each entity of an organization based on an organization identifier from a data store in response to receipt of the organization identifier and description associated with a transaction, wherein the entity embedding is saved to the data store after being published to a stream with a subscriber storage application that enables stream processing and data storage in accordance with a publish/subscribe model;
invoke a machine learning model with the entity embedding and the description, wherein the machine learning model is trained to infer a transaction embedding from the description and compute a similarity score between the transaction embedding and each vector of the entity embedding; and
return a candidate entity with a similarity score that satisfies a threshold.

13. The system of claim 12 wherein returning the candidate entity further comprises returning the candidate entity with a highest similarity score that satisfies the threshold.

14. The system of claim 12, further comprising automatically filling a field in a graphical user interface associated with the transaction with the candidate entity.

15. The system of claim 12, wherein the organization is a business, the entity is a payee, and the transaction is a bank transaction.

16. The system of claim 12, wherein retrieve the entity embedding further comprises retrieve the entity embedding from a key-value store using the organization identifier as a key to look up an organization-specific entity embedding.

17. A training method, comprising:
receiving positive labeled training data comprising historical user feedback including a user-selected entity for a transaction and negative labeled training data comprising historical user feedback and a randomly selected entity different from the user-selected entity;
training a language model with the positive labeled training data and the negative labeled training data to generate embeddings;
invoking the language model on a set of entities associated with an organization generating entity embeddings; and
saving the entity embeddings to a key-value store, wherein an organization identifier is the a key, and the entity embeddings are saved to the key-value store after being published to a stream with a subscriber storage application that enables stream processing and data storage in accordance with a publish/subscribe model.

18. The method of claim 17, further comprising preprocessing the positive labeled training data and the negative labeled training data by computing a relevance score of one or more keywords and removing at least one of the one or more keywords with a lowest relevance score and removing at least one of the one or more keywords with a highest relevance score.

19. The method of claim 17, further comprising:
determining a smallest size an entity embedding can be without reducing model performance; and
reducing the entity embedding size to the smallest size before saving the embedding to the key-value store.

20. The method of claim 17, where training the language model comprises updating a pre-existing natural language model with the positive labeled training data and the negative labeled training data.

* * * * *